Jan. 9, 1940.  J. MIHALYI  2,186,615
COMBINED VIEW AND RANGE FINDER
Filed April 14, 1938
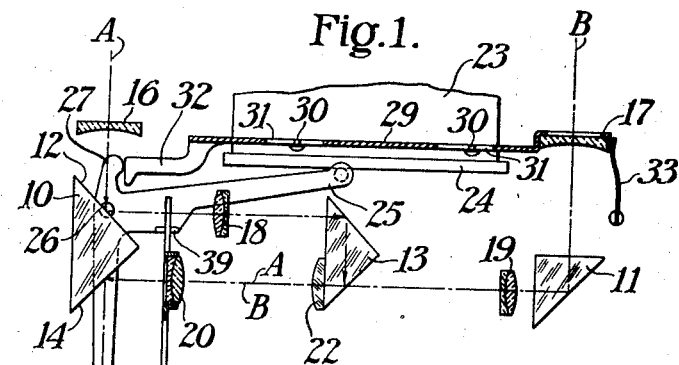
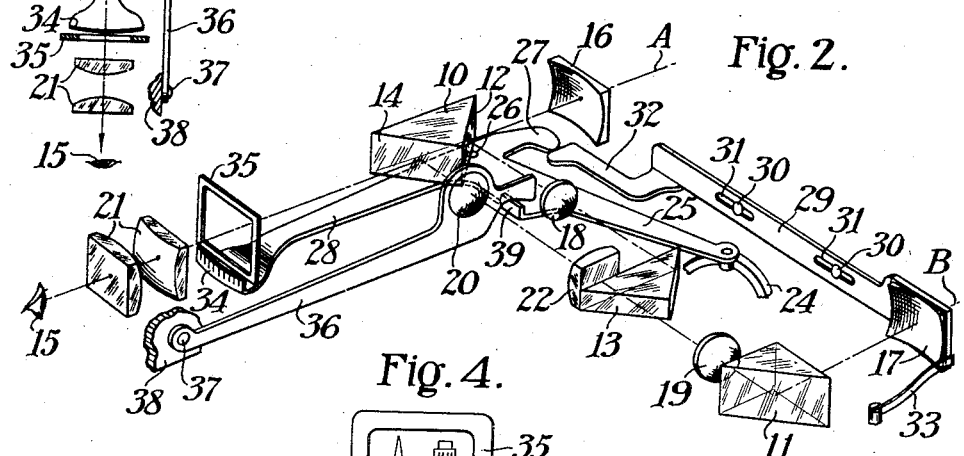
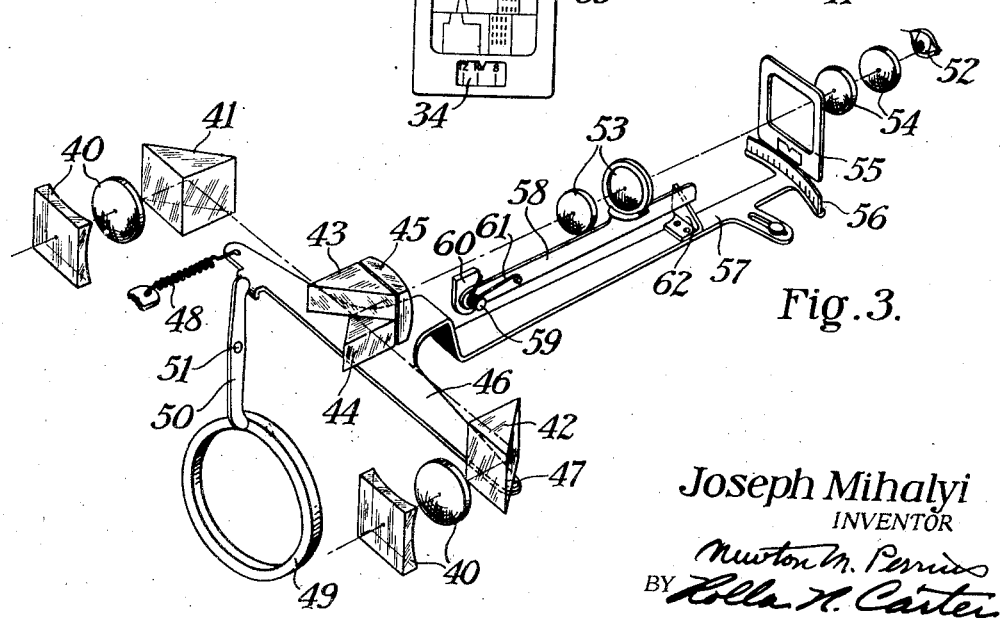
Joseph Mihalyi
INVENTOR
BY
ATTORNEYS Patented Jan. 9, 1940

2,186,615

UNITED STATES PATENT OFFICE 2,186,615

COMBINED VIEW AND RANGE FINDER

Joseph Mihalyi, Rochester, N. Y., assignor to Eastman Kodak Company, Rochester, N. Y., a corporation of New Jersey Application April 14, 1938, Serial No. 201,998

3 Claims. (Cl. 88—2.7)

This invention relates to a combined view and range finder of the telescopic split field type particularly adapted to be coupled to the focusing of a camera.

It has often been proposed to construct a base type range finder so as to employ one of the range finder beams for showing the field of view which a camera will photograph. However, the optical requirements for view finding differ from those for range finding and make it difficult to satisfy both requirements without sacrifice.

It is an object of this invention to provide a combined range and view finder system which is so constructed and arranged that the split images of the range finder constitute the finder field and are of such size as to insure speed and accuracy of adjustment which are particularly important when the finder is coupled to a camera.

Another object of the invention is to provide a range finder particularly adapted to be coupled to a camera and provided with means for compensating for parallax resulting from its separation from the camera lens.

Another object of the invention is the provision of a range finder having the desired long optical path but having a relatively short physical length so as to be available for use on small hand cameras.

Other objects and advantages of the invention will appear from the following description when read in connection with the accompanying drawing, and its scope will be pointed out in the appended claims.

In the drawing forming a part of this disclosure:

Fig. 1 is a plan view partly in section of the optical system and certain adjustable parts of a combined view and range finder made in accordance with the invention.

Fig. 2 is a view in perspective of the arrangement shown in Fig. 1.

Fig. 3 is a view in perspective of a form of the invention suitable for coupling to the lens of a motion picture camera and, Fig. 4 shows the field of view as observed through the systems shown in Figs. 1, 2 and 3.

According to the invention, a base type range finder, including two spaced beam collecting members and a beam combining unit, is provided with a telescope spaced optically from the combining unit. Each of the two beams in front of the combining unit contains a front negative lens and a rear collective lens so positioned as to form at the combining unit adjacent images of vertically adjacent portions of a field of view. A collective lens positioned substantially in the plane of these images functions as a field lens for the telescope employed for viewing these images.

In Fig. 1, an embodiment of the invention particularly adapted for use on a small hand camera, is illustrated as comprising two horizontally spaced light deflecting elements 10 and 11 for accepting separated measuring beams A and B, respectively, and determining the base of the range finder system. The element 10 is provided with a front inclined reflecting surface 12 for bending beam A through 90° and directing into a horizontally positioned member such as a prism 13 adapted to bend the beam A through two more right angles lying in the plane of the beam A and onto a rear inclined reflecting surface 14 provided on the element 10 which serves to direct the beam A to an observation point 15. It will be understood that the several bendings of the beams A and B may be accomplished by employing separate prisms, separate mirrors, or the like.

The element 11 directs the beam B directly onto the reflecting surface 14 which in turn directs it to the observation point 15 so that the beams A and B occupy substantially the same path between the prism 13 and the observation point 15.

The range finder system as above described if employed with zero optical power would be very unsatisfactory for range finding purposes and totally ineffective for view finding purposes. In order to provide a system suitable for both range and view finding there is positioned in the beams A and B, negative lenses 16 and 17, respectively, behind which are located achromatic objectives 18 and 19 for reimaging in a common plane the virtual images provided by the lenses 16 and 17. This common image plane is preferably caused to be near the point at which the two beams A and B come together, i. e., near the exit surface of the prism 13. At this plane the two images in beams A and B are fully split, or separated, and adjacent and correspond to adjacent vertical portions of the field of view from which the beams A and B emanate.

These images are viewed by means of a telescope comprising an objective lens 20 and an ocular 21 which of course causes the inverted adjacent images formed by the objectives 18 and 19 to appear upright to an observer at 15. To improve the light efficiency of the system a collective field lens 22 is positioned near the common image plane of the objectives 18 and 19.

From the above description it will be seen that the improved range and view finder of my invention makes possible the use of a long optical axis with a relatively short overall physical length and that the adjacent images employed for range finding combine to provide a satisfactory image for view finding.

The system above described is shown in Figs. 1 and 2 as applied to a small hand camera, parts only of which are illustrated, having an objective mount 23 which is axially movable for focusing. The mount 23 carries a raised ring 24 or other suitable means for engaging an arm 25 pivoted at 26 and provided with front and rear extensions 27 and 28, respectively, for actuating the range finder and framing the images in a manner now to be described.

The negative lens 17 is mounted in the end of a bar 29 secured for horizontal movement on the camera by pins 30 projecting through horizontally elongated slots 31 provided in the bar 29. The bar 29 carries a projecting part 32 arranged to engage the rounded end of the front extension 27 of the arm 25 and is suitably held in yielding engagement therewith by a spring 33. Thus when the camera objective mount 23 is moved axially in focusing a corresponding lateral movement is imparted to the negative lens 17 and the coupling arrangement is such that the adjacent images formed in the range finder will be in coincidence for objects at the distance for which the camera is focused. The setting of the range finder is indicated to the observer at 15 by means of a scale 34 movable with and carried by the rear extension 28 of the arm 25 in the field visible through the ocular 21 as shown.

In order to define the images visible through the ocular 21 and limit them to the field of view proper for the camera a stationary frame 35 is positioned substantially in the image plane of the telescope objective lens 20. The images as viewed by an observer will appear as shown in Fig. 4.

When, as usually is the case, the beams A and B are accepted above the optic axis of the camera objective it is desirable to introduce into the range and view finder a compensating adjustment to correct for parallax. The system of my invention readily lends itself to this purpose by causing the telescope objective lens 20 to be shifted vertically in accordance with the distance setting of the finder. As shown in Figs. 1 and 2 the lens 20 is carried by an arm 36 pivoted at one end on a pin 37 secured to a suitable part of the camera body 38 and having its other end riding upon an upturned ear 39 provided on the arm 25.

The range and view finding system of my invention is shown in Fig. 3 as adapted for use on an elongated camera such as a motion picture camera. In this arrangement two sets of negative and positive lenses 40 cooperate with end prisms 41 and 42 and coincidence prisms 43 and 44 to form two vertically adjacent images substantially in the plane of a collective field lens 45. For deviating a measuring beam, the prism 42 is mounted on an arm 46 in any suitable manner and adapted to rotate about a pivot 47 to which the arm 46 is secured. The arm 46 is given a counter clockwise bias by a spring 48 and is adapted to be rotated against the force of this bias by the focusing movement of the camera objective mount indicated by ring 49 through a coupling lever 50 having a pivot 51 intermediate its length.

The range and view finder images formed, as above described, in the field lens 45 are made to appear upright and of the proper apparent size to an observer 52 by a telescope having objective lenses 53 which form an erected image and an ocular 54 for viewing the erected image. This erected image is limited to the desired field by a frame 55 the lower margin of which may be perforated to permit observation of a scale 56 carried by a rearwardly projecting part 57 of the arm 46.

The telescope objective lenses 53 or, as shown, one of these lenses may be arranged for vertical movement to compensate for parallax by mounting it on a rod 58 pivoted at its forward end on a pin 59 secured to a fixed part 60 of the camera. A spring 61 serves to urge the rod 58 against an inclined edge of an upstanding ear 62 carried by the part 57 of the arm 46. It is thus evident that lateral movement of the part 57 caused by focusing adjustment of the part 49 will correspondingly raise or lower the rod 58 and its lens to compensate for parallax for the various distances for which the range finder is adjusted.

Inasmuch as the optical performance of the system shown in Fig. 3 is substantially the same as that of the embodiment shown in Figs. 1 and 2, it has not been described in such detail.

It will be obvious that the several optical elements employed may be replaced with optically equivalent elements and that the combined range and view finder of my invention may be embodied in various forms without departing from the invention the scope of which is defined in the appended claims.

What I claim as new and desire to secure by Letters Patent of the United States is:

1. In combination, a range finder having two spaced reflectors defining a horizontal base and adapted to accept light beams coming from a distant object and direct them along paths parallel to such base, means for forming in a plane perpendicular to the base adjacent images with the light directed by said reflectors, a telescope including an objective lens having its optic axis parallel to said base and positioned for viewing said images, a member movable for adjusting the range finder, means actuated by the movement of the member for shifting said images horizontally relatively to one another, and means controlled by said member for moving said objective lens in a vertical direction in strict accordance with the movement of said member.

2. A range finder particularly adapted for use on a camera, comprising a beam accepting and combining unit, having two spaced beams of light coming from an object and directing them in a single direction along adjacent paths, a negative lens in each light beams for forming a virtual image of the object, a collective lens in each light beam between the negative lens and the point where the beams begin to follow adjacent paths for reimaging the virtual image formed by each negative lens, the position and focal length of each collective lens being such that the images they form lie in a single plane substantially at the point where the beams begin to follow adjacent paths, a collective field lens substantially in the plane of the images formed by said collective lenses, and a telescope including an objective lens and an ocular for viewing the images in said field lens, said objective lens serving to relay to the focal plane of the ocular an inverted image of the images at said field lens.

3. A range finder as claimed in claim 2 wherein the telescope objective lens is movable perpendicular to its optic axis for shifting the field of view visible through the range finder, a member is movable to alter the setting of the range finder and a coupling translates the movement of said member into corresponding movement of said objective lens.

JOSEPH MIHALYI.